United States Patent Office 3,733,377

Patented May 15, 1973

3,733,377

METHYLACETYLENE DIADDUCTS OF DIALKYL DITHIOPHOSPHORIC ACIDS

Alexis A. Oswald, Mountainside, N.J., assignor to Esso Research and Engineering Company No Drawing. Continuation-in-part of abandoned application Ser. No. 518,028, Jan. 3, 1966. This application Mar. 15, 1971, Ser. No. 124,564

Int. Cl. A01n *9/36;* C07f *9/16;* C10m *1/48*

U.S. Cl. 260—948 5 Claims

ABSTRACT OF THE DISCLOSURE

Methylacetylene diadducts of dialkyl dithiophosphoric acids are prepared via selective free radical and electrophilic reactions. The free radical reactions can be carried out to yield the corresponding vinylic dithiophosphate monoadducts. These in turn are reacted with thiols to yield sequential diadducts. Some of the novel sequential diadduct dithiophosphate esters are unexpectedly suitable for animal insecticide applications, due to the detoxifying effect of their β-alkyl substituents on the hydrocarbylthioethyl moiety.

CROSS-REFERENCE TO OTHER APPLICATIONS

This application is a continuation-in-part of an application, entitled "Adducts of Dialkyl Dithiophosphoric Acid," of Ser. No. 518,028 which was filed on Jan. 3, 1966 and which is now abandoned.

FIELD OF THE INVENTION

This invention relates to novel organophosphorus compounds and to novel processes for preparing the same. In particular, this invention relates to methylacetylene diadducts of dialkyl dithiophosphoric acids. Of special interest are the radical type diadducts, which are prepared by a mono-addition of a dialkyl dithiophosphoric acid followed by the addition of an organic thiol. Some of these adducts, i.e. β-methyl substituted S-hydrocarbylthioethyl lower dialkyl dithiophosphates are unexpectedly safe and effective pesticides.

PRIOR ART VERSUS PRESENT INVENTION

The reaction between O,O'-dihydrocarbyl dithiophosphoric acids and a variety of unsaturated organic compounds is known to produce mono- and diadducts of the unsaturate. For referense, see "Houben-Weyl, Methoden der Organischen Chemie," vol. XII/2, "Organische Phosphor-Verbindungen," pp. 709–720, ed., E. Mueller, publ., G. Thieme Verlag, Stuttgart, Geermany, 1964, and U.S. Pats. 3,340,332 and 3,449,474. Some of these adducts possess properties which makes them suitable as lubricating oil additives and/or pesticides. The importance of selected members of the known types of adducts has stimulated interest in other adducts and in novel selective methods of their preparation.

The mono-addition of dialkyl dithiophosphoric acids to equimolar amounts of acetylene and alkylacetylenes in the presence of chemical free radical initiators is described in the prior art. See, for example, U.S. Pat. 3,067,232. It is also described in the same patent, that activated acetylenes such as phenylacetylene and dimethylacetylene dicarboxylate can be reacted with dialkyl dithiophosphoric acids at low temperatures. Nonactivated acetylenes, such as acetylene itself and alkylacetylenes, particularly methylacetylene, were known to react only at higher temperatures, where side reactions occur.

In the present invention, a selective low temperature process was found for the preparation of novel free radical monoadducts of methylacetylene. Besides the use of low temperatures, another distinguishing feature of the present free radical process is the use of nonchemical type, i.e., radiation, reaction initiators. Both of these features are important not only in making novel free radical methylacetylene monoadducts available, but in making the novel addition process safer than the known nonselective high temperature processes.

Surprisingly, it was also found in the present invention that dialkyl dithiophosphoric acids readily react with alkylacetylenes by a cationic mechanism in the absence of added catalysts to yield the corresponding Markovnikov type mono- and diadducts.

The diaddition of dialkyl dithiophosphoric acids to acetylenes is not described in the prior art. A copending application of ours, i.e. Ser. No. 884,046 filed on Dec. 10, 1969, now abandoned, describes that two moles of a dialkyl monothiophosphoric acid could not be added to one mole of methylacetylene. In view of this, it is especially surprising that it was found in the present invention that the diaddition of dialkyl dithiophosphoric acids to methylacetylene does take place via both free radical and cationic mechanisms.

SUMMARY OF THE INVENTION

In the present invention, it has been surprisingly found that, in the presence of nonchemical free radical initiators, alkylacetylenes, such as methylacetylene, and dialkyl dithiophosphoric acids react in a free radical manner at low temperatures. To distinguish the present invention over the prior art, the novel process was compared with known higher temperature processes for the reaction of alkylacetylenes with dialkyl dithiophosphoric acids. It was found that a higher temperature process, of reacting methylacetylene and a dialkyl dithiophosphoric acid as disclosed in U.S. Pat. 3,067,232, leads, already at 50° C., to diadduct formation by the following reactions:

(1)

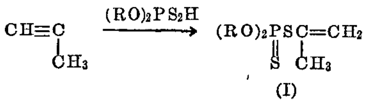

(I)

(2)

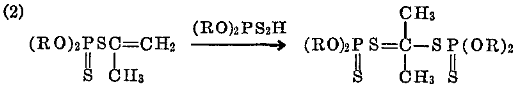

(II)

It was furthermore observed that the monoadduct precursor, i.e., S-isopropenyl dialkyldithiophosphate (I) of this diadduct, 2,2-bis-dialkylthiophosphorylmercapto-propane (II), could not be isolated when equimolar amounts of reactants were used. It is assumed that under these experimental conditions, this adduct (I) is extremely reactive towards another mole of dialkyldithiophosphoric acid.

The structure of the final product shows that cationic additions took place instead of the expected free radical additions. Such additions are effectively catalyzed by the dialkyl dithiophosphoric acid reactant at the higher reaction temperatures of the prior art and as such will occur both in the presence and in the absence of free radical initiators.

However, in accordance with one aspect of the present invention, it was found that the desirable free radical additions can be carried out with alkyl acetylenes if different process conditions are used. At first, it was observed that the ionic additions could be suppressed if highly elevated temperatures are avoided. Free radical reactions, on the other hand, could be initiated at ambient temperatures or below by nonchemical means, i.e., by ultraviolet or gamma irradiation. Dependent on the relative molar ratio of reactants these reactions were found to yield either the radical monoadducts, e.g., S-propenyl-dialkyldithiophosphate (III) or the radical diadduct, e.g., bis-1,2-dialkylthiophosphorylmercapto-propane (IV) as the main products. These reactions in the case of methylacetylene can be depicted as follows:

(3)
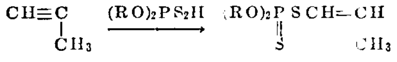
(III)

(4)
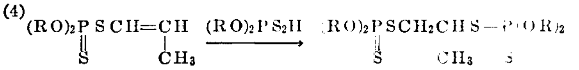
(IV)

According to another aspect of the present invention, it has been found that the radical monoadducts can be further reacted with an organic thiol to yield mixed radical diadducts. For example, the methylacetylene monoadducts, i.e., S-propenyl dihydrocarbyl dithiophosphates (III) can be reacted with thiols as indicated by the following Equation 5.

(5)
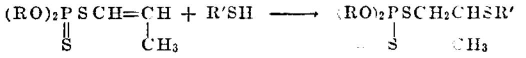
(III) (V)

In the preparation of these mixed adducts (V), i.e., reaction 5, radiation and conventional chemical free radical initiators can both be used. The order of these mixed diadditions is, however, extremely important because alkenyl hydrocarbyl sulfides react spontaneously with dialkyldithiophosphoric acids in an ionic manner to yield mixed diadducts of a different type. An example of this type of reaction is depicted hereinbelow (reaction 6) to yield S-1-hydrocarbylmercaptopropyl dialkyldithiophosphates (VI).

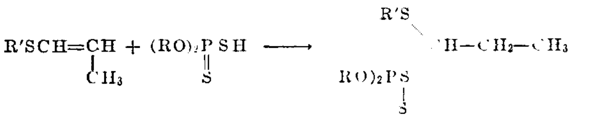
(VI)

These mixed diadducts of the present invention (Type V) are particularly desirable for pesticidal use. When compared to pesticidal phosphate esters of somewhat similar structure, they showed a relatively low level of toxicity towards warm-blooded animals, such as mice, rats, guinea pigs, cats and cows, i.e., a greater level of safety when used as pesticides. This safety allows the use of the present compounds in new fields of applications, e.g., as systemic animal insecticides.

As an example of the high toxicity of prior art compounds of similar structure, the median lethal dose ($LD_{50}$) for mice for the compound,

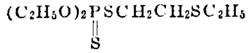

is about 6 mg. per body kg. See the monograph entitled "Die Entwicklung neuer Insektizider Phosphorsäure-Ester," by Gerhard Schrader published by Verlag Chemie GmbH., Weinheim/Bergstr., Germany in 1963. In contrast, the mixed diadducts depicted by Formula V show $LD_{50}$ values in the range of 25–250 mg. per kg. of body weight. Moreover, all of the diadducts of the present invention have a primary phosphate ester structure, which is more resistant to hydrolysis than the secondary or tertiary ester structures. From a practical viewpoint, this resistance is very important because these compounds are often used in the form of an aqueous emulsion for pesticidal spray applications.

It is therefore, an object of the present invention to provide the art with novel dihydrocarbyl dithiophosphoric acid and adducts of acetylenes. Another object of the present invention is to provide a process for preparing such novel adducts. This invention also describes an improved, safer method of controlling pests with the novel compositions. In this respect, this application describes a novel, unexpected use as systemic animal insecticides. Finally, the S-propenyl dihydrocarbyl dithiophosphate adducts of the present invention are also useful as lubricating additives.

The exact nature of the present invention will be more clearly perceived and fully understood by referring to the following description and claims.

Process reactants

The S-propenyl dihydrocarbyldithiophosphate intermediates of the present invention are prepared by reacting methyl acetylene with a dihydrocarbylidithiophosphoric acid having the following structural formula:

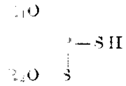
(VII)

wherein $R_1$ and $R_2$ represent any hydrocarbon radical, such as for example, alkyl, aryl or substituted aryl. Particularly preferred compounds of this invention are prepared from acids wherein $R_1$ and $R_2$ are each selected from the group consisting of $C_1$–$C_{30}$ alkyl, $C_6$–$C_{10}$ aryl, $C_6$–$C_{30}$ alkaryl or aralkyl, and halo and nitro substituted $C_6$–$C_{10}$ aryl. For pesticidal applications, especially preferred compounds are prepared from acids wherein $R_1$ and $R_2$ are each selected from the group consisting of $C_1$–$C_3$ alkyl and $C_6$–$C_9$ aryl.

Suitable examples of $R_1$ and $R_2$ include: (a) methyl, ethyl, n-propyl, i-propyl, butyl, pentyl, octyl, decyl, pentadecyl, octadecyl, dodecyl, eicosyl, docosyl, pentacosyl and triacontyl; (b) phenyl, ethylphenyl, toluyl, xylyl, and naphthyl; (c) 2-chlorophenyl, 3-bromo-phenyl, 5-chloro-toluyl, dichloro-toluyl; and (d) 2-nitro-phenyl, 3-nitro-toluyl, 2-nitro-m-xylyl, and 2,5-dinitro-m-xylyl.

The preferred reaction product derived from these reactants and methylacetylene has the general formula:

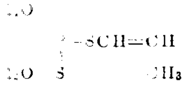
(VIII)

wherein the meaning of the various R groups is the same.

The S–2 hydrocarbylmercaptopropyl dihydrocarbyldithiophosphate products of the present invention are prepared by reacting the above S-propenyl dihydrocarbyldithiophosphate intermediates with hydrocarbon thiols of the formula:

$$R_4\text{-SH}$$

wherein $R_4$ is selected from the group consisting of $C_1$–$C_5$ alkyl, $C_6$–$C_{10}$ aryl, $C_6$–$C_{10}$ alkaryl, halo-substituted $C_6$–$C_{10}$ aryl, and nitro-substituted $C_6$–$C_{10}$ aryl. Preferably, $R_4$ is a $C_1$–$C_3$ alkyl group.

Suitable examples of organic thiols include: methanethiol, ethanethiol, n-propanethiol, i-propanethiol, n-butanethiol, benzenethiol, α-naphthalenethiol, o-toluenethiol, 4-chlorobenzenethiol, 4 - nitro - benzenethiol, 3-chloro-p-toluenethiol, 2,4 - dichlorobenzenethiol, and 4-methylmercaptobenzenethiol, 4-fluorobenzenethiol.

Process conditions

The free radical type reaction between methylacetylene and the dihydrocarbyldithiophosphoric acid can be carried out at a temperature of between about −80° C. and about 40° C., preferably between about 0° C. and about 30° C., more preferably, at ambient temperatures, i.e. between about 16° C. and about 28° C. The reaction can be performed in the liquid phase at pressures of between about atmospheric and about 50 atmospheres. However, autogeneous pressures resulting from methyl acetylene are preferred.

The catalysts employed in the above-described reaction are nonchemical free radical initiators. Suitable, nonchemical free radical initiators include ultraviolet light and gamma radiation. Ultraviolet light is preferred. In general, the source of the ultraviolet light or gamma (X)-ray radiation is not critical. A 70-watt high pressure mercury arc lamp which emits a light of wide spectrum wavelength can be suitably employed in the laboratory; however, any source of ultraviolet light regardless of the quantity of wattage can be used. It should be noted that the more intense the source, the faster the reaction proceeds. In the case of gamma radiation, a thousand to ten thousand Curie ($Co^{60}$) source is, for example, suitable to initiate the reaction from a distance of about 6 cm.

The general preference for initiation by radiation is due to the higher selectivity of the reaction at lower reaction temperatures. The initiation by radiation can be readily accomplished at low temperatures, while most chemical initiators must be used at elevated temperatures.

In preparing the monoadduct of methylacetylene and the dihydrocarbyldithiophosphoric acid, mole ratios of methylacetylene to the dihydrocarbyldithiophosphoric acid can range between about 1:1 and about 5:1. The preferred reactant ratios are between 2:1 and 4:1. When the principal product desired is the diadduct, the mole ratio of methyl acetylene to the dihydrocarbyldithiophosphoric acid ranges between about 1:3 and about 2:1, preferably between 1:3 and 1:2.

The nonchemical free radical initiated reaction between methylacetylene and a dihydrocarbyldithiophosphoric acid can be carried out in the presence of an inert diluent. Preferably, no diluent is employed. Suitable diluents which can be employed, if desired, include: $C_2$–$C_{10}$ aliphatic hydrocarbons, such as octane, $C_5$–$C_{10}$ cycloaliphatic hydrocarbons, such as cyclohexane, ethers, such as diethyl ether, and thioethers, such as dimethyl sulfide.

The free radical type reaction between the unsaturated monoadduct of methylacetylene, i.e., the S-propenyl dihydrocarbyldithiophosphate, VIII, and the organic thiol, IX, can be carried out at a temperature of between about −80° C. and about 100° C. If radiation is used for reaction initiation, the temperature should be preferably between about −80° C. and about 40° C., more preferably between about 0° C. and about 30° C., and more preferably at ambient temperature, i.e., between about 16° C. and about 28° C. The preferred temperature range in the case of chemical initiators depends on the decomposition temperature of the initiator compound to be used. Pressures employed are, in general, atmospheric or autogenous, the latter of which can vary up to about 20 atmospheres.

The preparation of the mixed diadduct is catalyzed by any conventional free radical initiator, both chemical and nonchemical. Specifically, such catalysts include ultraviolet light, gamma irradiation and a wide variety of organic peroxides, hydroperoxides and azo-compounds conventionally employed as free radical initiators. Typical chemical free radical initiators include: cumene hydroperoxide, t-butyl hydroperoxide, bis-t-butyl peroxide, benzoyl peroxide, azo-bis-isobutyronitrile, etc.

In general, the amount of chemical free radical initiator employed can vary over a broad range, but preferably it will range between about 0.05 and about 5 mole percent based on the total amount of reactants.

The mole ratio of organic thiol compound to the S-propenyl dihydrocarbyldithiophosphate can vary between about 1:1 and about 10:1, preferably between 1.0:1.1 and 1.0:2.0. An excess of the organic thiol compound is preferred when higher reaction rates and more complete monoadduct conversions are desired.

Suitable diluents can be employed to prepare the above-described mixed diadducts and those described in connection with the preparation of the S-propenyl dihydrocarbyldithiophosphates are suitable examples thereof. However, as in the case of the monoadduct preparation, it is preferred not to use a diluent.

Compositions

The novel compositions claimed in the present invention are represented by the general formula:

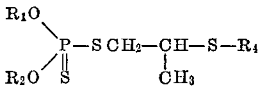

X wherein $R_1$ and $R_2$ are $C_1$ to $C_{30}$ unsubstituted hydrocarbon radicals and $C_1$ to $C_{30}$ monosubstituted hydrocarbon radicals selected from said monochloro, mononitro substituted radicals. It is preferred that $R_1$ and $R_2$ be $C_1$ to $C_{16}$ saturated aliphatic, alkylphenyl and phenylalkyl hydrocarbon radicals and their monochloro and mononitroderivatives. More preferably, $R_1$ and $R_2$ are $C_1$ to $C_3$ alkyl radicals, phenyl, chlorophenyl, nitrophenyl, $C_7$ to $C_{10}$ alkylphenyl, $C_7$ to $C_{10}$ phenylalkyl, $C_7$ to $C_{10}$ alkylchlorophenyl radicals. Most preferably, $R_1$ and $R_2$ are methyl and ethyl. The $R_4$ radical is selected from the group consisting of $C_1$ to $C_5$ alkyl, phenyl, $C_7$–$C_{10}$ alkylphenyl, $C_7$–$C_{10}$ phenylalkyl, chlorophenyl, bromophenyl, nitrophenyl. Preferably $R_4$ is a $C_1$ to $C_3$ alkyl. Most preferably, $R_4$ is methyl and ethyl.

The preferred compositions of the present invention are of the formula:

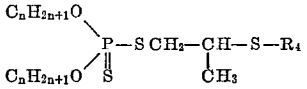

wherein $n$ is 1 and 10 and $R_4$ is $C_1$ to $C_5$ alkyl, phenyl and chlorophenyl. These preferred compounds possess an especially high degree of pesticidal activity.

The most preferred compositions of the present invention are of the formula:

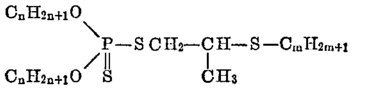

wherein $m$ and $n$ are 1 and 2.

Examples of suitable $R_1$, $R_2$ and $R_3$ substituents were provided with the discussion of the starting materials for these compositions.

Examples of the preferred novel compositions of the present invention are listed in the following: dimethyl 2-i-butylthiopropyl dithiophosphate, diethyl 2-p-chlorophenylthiopropyl dithiophosphate, methyl ethyl 2-i-propylthiopropyl dithiophosphate, ethyl cyclohexyl 2-methylthiopropyl dithiophosphate, diphenyl ethylthiopropyl dithiophosphate, ditolyl 2-trichlorophenylthiopropyl dithiophosphate, dipropyl 2-pentylthiopropyl dithiophosphate, ethyl propyl 4-p-nitrophenyl dithiophosphate, ethyl benzyl 2-cyclopentylthiopropyl dithiophosphate, dibutyl 2-p-tolylthiopropyl dithiophosphate.

The new diadducts are useful as pesticides. Some of them are outstanding systemic pesticides relatively safe to use. Others are contact insecticides. A few of them, due to their low toxicity, have a high potential for controlling animal insects, preferably via systemic action. Of course, dependent on their particular structure, they possess different degrees of attractiveness for the various useful applications. Various concentrations of the different diadducts may be required as active ingredients in pesticidal compositions to provide effective insect control.

For example, the particularly attractive sequential diadducts from the viewpoint of systemic plant insecticide applications are those having a significant degree of solubility in water. Water solubility allows such compounds to be transported in the plant sap from the roots to the leaves. In terms of substituents this means that from this viewpoint the most desirable diadducts have their $R_1$, $R_2$ and $R_4$ groups selected from methyl and ethyl groups.

From the viewpoint of contact insecticidal and fungicidal activity on the other hand one may wish to select aromatic radical substituents, particularly for $F_4$.

The novel mixed diadducts of the present invention can be employed as pesticidal compositions in either a solid or liquid form. When used in a solid form, they may be reduced to an impalpable powder and applied as an undiluted dust or mixed with a solid carrier such as clay, talc and bentonite, as well as other inert carriers known in the art. The mixed diadduct can also be applied as a spray in a liquid carrier either as a solution in a solvent or in an emulsion in a non-solvent such as water. In the diluted solid or liquid form, the mixed diadducts of the present invention can be employed in an amount of between about 0.0001 and about 15.0 wt. percent, based on the inert carrier. Typical liquid solvents include such compounds as acetone, ethyl alcohol, benzene, naphtha, etc. Suitable wetting agents and emulsifying agents can also be employed in preparing the pesticidal compositions. The mixed diadducts of the present process can also be admixed with carriers that are themselves pesticides. Finally, the active compounds of the present invention can be used without dilution as an atomized mist.

EXAMPLE 1

A mixture of 94.8 grams (0.6 mole) of dimethyldithiophosphoric acid and 40 grams (1.0 mole) of methyl acetylene was irradiated at 17° C. with ultraviolet light from a high pressure mercury arc of 75 watt Hanau immersion lamp for 24 hours with magnetic stirring in a closed quartz tube. Subsequent distillation of the reaction mixture yielded 104.8 grams (82%) of S-propenyl dimethyldithiophosphate as a colorless liquid boiling between 60–64° C. at a pressure of 0.3 mm.

*Analysis.*—Calcd. for $C_5H_{11}O_2PS_2$ (percent): C, 30.30; H, 5.59; P, 15.62; S, 32.35. Found (percent): C, 29.74; H, 5.50; P, 15.60; S, 32.21.

EXAMPLE 2

A mixture of 93 grams (0.5 mole) of diethyldithiophosphoric acid and 40 grams (1.0 mole) of methyl acetylene was reacted for 65 hours under the conditions of Example 1. Subsequent distillation of the crude product yielded 89.9 grams (79.5%) of S-propenyl diethyldithiophosphate as a yellow-tinted liquid boiling between 74–78° C. at a pressure of 0.4 mm.

*Analysis.*—Calcd. for $C_7H_{15}O_2PS_2$ (percent) C, 37.16; H, 6.68; P, 13.68; S, 28.34. Found (percent): C, 36.93; H, 6.55; 13.65; S 28.20.

EXAMPLE 3

A mixture of 47.4 grams (0.3 mole) of dimethyldithiophosphoric acid and 6 grams (0.15 mole) of methyl acetylene was reacted in the manner described in Example 1. The resulting colorless crude product was freed from the volatile S-propenyl dimethyldithiophosphate by-product by heating at 142° C. under 0.2 mm. pressure. This resulted in the recovery of 7.20 grams of the monoadduct as a distillate boiling at 55–60° C. and 36 grams (75%) of the 1,2 - bis-dimethylthiophosphorylmercaptopropane diadduct as a slightly yellow, somewhat viscous, distillation residue.

*Analysis.*—Calcd. for $C_{17}H_{18}O_4P_2S_4$ (percent): C, 23.59; H, 5.09; P, 17.38; S, 35.99. Found (percent): C, 24.01; H, 5.02; P, 16.92; S, 36.10.

EXAMPLE 4

A mixture of 55.8 grams (0.3 mole) of diethyldithiophosphoric acid and 6 grams (0.15 mole) of methyl acetylene was reacted in the manner described in Example 1. After the unreacted methyl acetylene was allowed to escape, the resulting yellow crude product was heated to 150° C. in vacuo to distill off the by-product, 12.9 grams of S-propenyl diethyldithiophosphate, boiling between 71–75° C. at a pressure of 0.2 mm. The yellow viscous liquid distillation residue (30 grams, 48.5%) was the desired 1,2-bis-diethylthiophosphorylmercaptopropane.

*Analysis.*—Calcd. for $C_{11}H_{26}O_4P_2S_4$ (percent): C, 32.03; H, 6.35; P, 15.01; S, 31.10. Found (percent): C, 32.05; H, 6.28; P, 14.7; S, 31.39.

EXAMPLE 5

A mixture of 59 grams (0.25 mole) of diisopropyldithiophosphoric acid and 30 grams (0.75 mole) of methyl acetylene was reacted for 65 hours in the manner described in Example 1. Fractional distillation yielded 62.2 grams (90%) of S-propenyl diisopropyldithiophosphate as a liquid boiling between 68–69° C. at 0.05 mm.

*Analysis.*—Calcd. for $C_9H_{19}O_2PS$ (percent): C, 42.50; H, 7.53; P, 12.18; S, 25.21. Found (percent): C, 42.48; H, 7.41; P, 12.34; S, 25.37.

EXAMPLE 6

A stirred mixture of 44.3 grams (0.28 mole) of 90% dimethyldithiophosphoric acid, containing 10% trimethyldithiophosphate, and 20.8 grams (0.52 mole) of methyl acetylene in a Pyrex pressure tube was heated at 40° C. for 65 hours. After releasing the excess of methyl acetylene, a colorless liquid product was obtained, which, according to silver nitrate titration, contained only 9% unreacted dimethyldithiophosphoric acid. The latter was removed by washing the solution of the crude reaction product in 300 ml. of ether with two 100 ml. portions of 5% aqueous sodium hydrogen carbonate solution. The ether solution was then dried and the solvent evaporated in vacuo to yield the neutral product. A nuclear magnetic resonance (NMR) spectrum of this product indicated that it was about 85% pure, ionic diadduct, i.e., 2,2-bis-dimethylthiophosphorylmercaptopropane. In addition, there were two compounds present in approximately equal quantities, i.e., the monoadduct and the trimethyldithiophosphate. They were carefully removed by distillation at a pressure of 0.0009 mm. from an 85° C. heating bath. In this manner 32 grams (71%) of pure ionic diadduct was obtained as a yellow distillation residue. This diadduct, when heated to temperatures above 100° C. under 0.8 mm. of pressure, thermally dissociated into the ionic monoadduct, S-isopropenyl dimethyldithiophosphate and dimethyldithiophosphoric acid. These components, however, recombined in the distillation receiver flask at room temperature.

EXAMPLE 7

The reaction described in the previous example was carried out under the same conditions but in the presence of 0.5 gram (0.2 mole) of benzoyl peroxide. The decomposition of the peroxide under the reaction conditions was indicated by the development of reddish brown color and the precipitation of a crystalline solid, apparently benzoic acid. Titration, NMR analysis and workup of the reaction mixture indicated that the ionic diadduct described in the previous example was formed as the main product (31.5 grams, i.e., 70%).

EXAMPLE 8

A stirred mixture of 18.8 g. (0.1 mole) of distilled diethyl dithiophoshoric acid and 12 g. (0.3 mole) of methyl acetylene in a Pyrex pressure tube was stirred at room temperature for 24 hours. The reaction mixture was then sampled for analyses and then heated at 40° C. for 24 hours. Analyses of the the intermediate and final reaction mixture after the release of excess methylacetylene were carried out by nuclear magnetic resonance (NMR) spectroscopy. The neutral mixture of final products after the removal of the unreacted acid by washing with aqueous sodium hydrogen carbonate solution in the usual manner was also analyzed by NMR. The results are tabulated below:

| Reaction mixture after— | Unreacted acid, percent $(C_2H_5O)_2PS_2H$ | Phosphorus equivalents in the form of— Ionic adducts, percent: Mono- $(C_2H_5O)_2PS_2C(CH_3)=CH_2$ | Di- $[(C_2H_5O)_2PS_2]_2C(CH_3)_2$ | Radical monoadducts, percent $(C_2H_5O)_2PS_2CH=CH-CH_3$ |
|---|---|---|---|---|
| 24 hours at 25° C. | 90 | | 8 | |
| Plus 24 hours at 40° C. | 48 | 15 | 35 | 2 |
| Plus acid removal | 0 | 28 | 71 | 1 |

The results show that the use of the threefold molar excess of methylacetylene at 40° C. resulted in the formation of significant amounts of the ionic monoadduct as well as of major amounts of the diadduct. After the removal of the acid, the crude product was distilled in vacuo. The ionic monoadduct was distilled as a colorless, mobile liquid between 44–46° C. at 0.1 mm. pressure from a bath of 100° C. The ionic diadduct was obtained as a clear, yellow liquid distillation residue. The structures of both adducts were determined by NMR.

EXAMPLE 9

A mixture of 9.3 g. (0.05 mole) of distilled diethyl dithiophosphoric acid and 16.0 g. (0.40 mole) methyl acetylene was reacted at 40° C. The reaction mixture was analyzed at periodic intervals by NMR in the manner described in the prevoius example. The results are tabulated below:

| Reaction mixture at 40° C. after— | Unreacted acid, percent | Phosphorus equivalents in the form of— Ionic adducts, percent: Mono- | Di- | Radical mono-adduct, percent |
|---|---|---|---|---|
| Hours: | | | | |
| 3 | 95 | 5 | | |
| 24 | 50 | 30 | 20 | |
| 48 | 10 | 46 | 35 | 7 |

The results show that the use of the eightfold molar excess of methylacetylene at 40° C. resulted in the formation of the ionic monoadduct as the major product.

EXAMPLE 10

A mixture of 94.8 grams (0.6 mole) of crude dimethyldithiophosphoric acid and 24 grams (0.6 mole) of methylacetylene was placed into a glass pressure tube, and irradiated for 18 hrs. by a $Co^{60}$ $\gamma$-ray source of about 4200 curies intensity placed in a 6 cm. distance. A nuclear magnetic resonance spectrum of the reaction mixture showed that it contained 55 mole percent of S-propenyl dimethyldithiophosphate, 30 mole percent of bis-2,2-dimethylphosphorylmercapto propane, and 15 mole percent of trimethyldithiophosphate, the latter as an impurity from the starting acid.

EXAMPLE 11

The products of Examples 1–4 and 6 were each dissolved in acetone and dispersed in distilled water with Triton X–100 emulsifier (an alkyl aryl polyether alcohol) to give spray emulsions of 0.025–0.050% concentration.

Each of these emulsions were used in standard laboratory insecticidal and miticidal tests as described hereinafter. Portions of the results are tabulated in Table I.

Insecticidal tests

Housefly tests.—Fifty adults of the CSMA (Chemical Specialties Manufacturers' Association) strain were sprayed in a 2″ x 5″ diameter stainess steel cage faced on top and bottom with 14 mesh screen. Flies were retained in the cage in which they are sprayed for knockdown observations and 24-hour mortality determinations. Mortality which results from this test may be from residual contact as well as by direct contact spray. DDT at 0.05% concentration was used as the positive standard.

Mexican bean beetle tests.—Lima bean leaves sprayed on the dorsal and ventral surfaces were offered to ten larvae of the Mexican bean beetle (late second instar) for a 48-hour feeding period. The feeding rate and mortality data were recorded as well as foliage injury if any, was recorded. DDT at 0.05% concentration was used as the positive standard.

Systemic insecticidal activity was evaluated by applying 20 ml. spray of the sample to the vermiculite substratum of potted pea plants. Forty-eight hours after application, the plants were infested with 10 adult pea aphids and mortality determination was made after 5 days. Demeton at 0.01% concentration was used as the positive standard.

Miticdal tsts

Spider mite tests.—Lima bean plants were infested with 50–100 adults of the strawberry spider mite, *Tetranychus atlanticus,* prior to testing. The infested plants were dipped into the test material and held for five dyas. Adult mortality as well as ovicidal action was noted. Aramite and Ovotran were used as positive standards at 0.1% concentration.

The data of Table I shows that all of the compounds tabulated are active pesticides. The data further show that the somewhat more hydrophilic propenyl dithiophosphate mono-adducts of Examples 1 and 2 have strong systemic pesticidal action, i.e., they are transported throughout the plant via the plant sap. In contrast, the bis-dithiophosphate adducts of Examples 3, 4 and 6 have only a contact action.

TABLE I

| Compound: Example | Structure | Spray conc., percent | Mortality, percent: Mexican bean beetles, 48 hrs. | Pea aphids: Contact, 48 hrs. | Pea aphids: Systemic, 5 days | Mites contact, 5 days |
|---|---|---|---|---|---|---|
| 1 | $(CH_3O)_2P(=S)-S\,CH=CH-CH_3$ | 0.050 | 100 | 50 | 100 | 91 |
| | | 0.025 | 100 | 50 | 100 | 50 |
| 2 | $(C_2H_5O)_2P(=S)-S\,CH=CH-CH_3$ | 0.050 | 100 | 100 | 100 | 62 |
| | | 0.025 | 100 | 10 | 50 | 86 |
| 3 | $(CH_3O)_2P(=S)-S\,CH_2CH(CH_3)-SP(=S)(COH_3)_2$ | 0.050 | 100 | 100 | 0 | 100 |
| | | 0.025 | 100 | 30 | 0 | 50 |
| 4 | $(C_2H_5O)_2P(=S)-S\,CH_2CH(CH_3)-S\,P(=S)(OC_2H_5)_2$ | 0.050 | 0 | 90 | 0 | 82 |
| 6 | $(CH_3O)_2P(=S)-S-C(CH_3)_2-S-P(=S)(OCH_3)_2$ | 0.050 | 50 | 100 | 0 | 100 |

EXAMPLE 12

S-propenyl dimethyldithiophosphate, as prepared in Example 1, was tested as a nematocide at 0.41 gram per gallon of soil equivalent to 100 lbs. per 4-inch acre. In the regular test, root knot nematodes (*Meloidigyne incognita*) were reared in a tomato plant-soil medium. Soil for test purposes was inoculated with infected soil and root knots from infected tomato plants. The sample was blended thoroughly with the soil in a V-shell blender. Four 1-pint paper pots were used for each treatment with one tomato transplant per pot. After 3 to 4 weeks under artificial light and overhead irrigation ,the roots of the plants were examined for degree of root knot formation. Inoculated controls normally have about 50–100 root knots per plant. Percent control was determined by a comparison of the knot counts on treated and untreated tomato plants. When tested in this manner, S-propenyl dimethyldithiophosphate showed 100% control.

EXAMPLE 13

The monoadduct of diisopropyldithiophosphoric acid and methyl acetylene (S-propenyl diisopropyldithiophosphate) was prepared as described in Example 5 and tested for activity as a lubricating oil additive. The product of this example was prepared with other dialkyldithiophosphoric acid adducts including a zinc salt of a mixture of isobutyl and n-amyl dithiophosphoric acids. In each instance, the comopsition was prepared by mixing a small amount of the additive (0.1 weight percent based on phosphorus) with a major portion of a mineral lubricating oil. The mineral lubricating oil employed in the tests was S.A.E. 30 grade 100 V.I. oil.

In the oxidation stability test, the oil was aerated at 207° C. (340±1° F.) for 23 hours in the presence of silver and copper-lead specimens attached to a shaft spun at a rate of 600 r.p.m. The extent of oxidation was measured by the increase of viscosity of the oil. The corrosivity of the oxidized oil appears as a weight change in the metallic specimens. After 3 and 19 hours, these specimens were replaced by new ones; consequently, the weight losses referred to the three intermediate periods between the start of the experiment and 23 hours.

The data shown in Table II indicate that the diisopropyldithiophosphoric acid monoadduct of methyl acetylene has antioxidant activity comparable to the activity of the zinc dialkyldithiophosphate.

The four-ball wear test (H. L. West, J. Inst. Petr. 32, 210, 222 (1946) was used for the characterization of hydrodynamic lubrication of steel surfaces by the oil. In the test, 3 steel balls were placed in a fixed triangular position and the fourth was mounted above them. The fourth ball was mounted in a chuck so that the assembly could be rotated under pressure while lubricated with the oil to be tested. The tests were carried out at a rotational speed of 1800 r.p.m. under 10 kg. of pressure at 150° C. for 30 minutes. Then, the balls were microscopically examined for scar diameters with are, of course, directly proportional to the wear.

The data of Table II show that the diisopropyldithiophosphoric acid-methyl acetylene monoadduct has better preventive wear properties than the zinc dialkyldithiophosphate.

In the regular extreme pressure test, ["load-bearing capacity SAE" Federal Test Method 6501.02 (15.15.1955)], two lubricated metallic surfaces were turned over each other at a rate of 1000 r.p.m. with 3.4/1 rubbing ratio under increasing pressure until seizure occurred.

The data of Table II show that the diisopropyldithiophosphoric acid monoadduct of methyl acetylene is superior in this test to the zinc dialkyldithiophosphate.

TABLE II

| Additive components | Additive concentration, percent P | CRE lube stability test: Oxidation viscosity, Saybolt, sec.: Initial | After oxidation | Corrosion, weight change, mg.: Ag. | Cu/Pb | 4-ball wear test scar, diameter, μ | Extreme pressure test, max. pressure (lbs.) seizure at— |
|---|---|---|---|---|---|---|---|
| 1. Base oil | | 48 | 81 | [illegible] | −309 | 0.407 | [illegible],100 |
| 2. Zinc dialkyldithiophosphate | 0.1 | 49 | 51 | [illegible] | [illegible] | 0.266 | [illegible],600 |
| 3. S-propenyl diisopropyldithiophosphate | 0.1 | 45 | [illegible] | [illegible] | −43 | 0.238 | 2,000 |

EXAMPLE 14

A mixture of 44.6 grams (0.2 mole) of S-propenyl diethyldithiophosphate and 18.6 grams (0.3 mole) ethanethiol was irradiated in a quartz vessel with a 75-watt Hanau high pressure ultraviolet lamp under nitrogen with stirring at 17° C. The progress of the addition reaction was followed by nuclear magnetic resonance (NMR) spectroscopy. In the absence of irradiation, no addition occurred. After 2 hours of irradiation, 32% of the S-propenyl diethyldithiophosphate reacted. NMR indicated this degree of disappearance of its unsaturation. In 24 hours, 77% conversion of the olefin was obtained. Subsequently, the liquid reaction mixture was diluted with 150 ml. of ether and washed with two 40 ml. portions of 5% aqueous sodium hydrogen carbonate solution to remove any acidic by-product. The ether phase was then dried over anhydrous sodium sulfate and distilled. After the removal of the ether, the unreacted S-propenyl diethyldithiophosphate was recovered. This was followed by the distillation of 33 grams (77% on the basis of the converted S-propenyl diethyldithiophosphate) of the S-2-ethylmercaptopropyl diethyldithiophosphate as a colorless liquid yith a yellow tint, boiling between 100–102° C. at 0.5 mm. pressure. An NMR spectrum of the product and its elemental analysis confirmed its structure. Gas chromatography showed it to be a single compound, free of structural isomers and impurities.

*Analysis.*—Calcd. for $C_9H_{21}O_2PS_2$ (percent): C, 37.48; H, 7.33; P, 10.73; S, 33.36. Found (percent): C, 37.45; H, 7.18; P, 10.87; S, 33.7.

EXAMPLE 15

A mixture of 49.5 grams (0.25 mole) of S-propenyl dimethyldithiophosphate and 23.25 grams (0.375 mole) of ethanethiol was reacted in the manner described in Example 14. S-propenyl dimethyldithiophosphate conversions of 45% after 2 hours and 86% after 24 hours were obtained. Sodium hydrogen carbonate washing and subsequent distillation of the reaction mixture yielded 38.7 grams (69%) of S-2-ethylmercaptopropyl diethyldithiophosphate as a colorless liquid boiling between 102–104° C. at a pressure of 0.3 mm.

*Analysis.*—Calcd. for $C_7H_{17}O_2PS$ (percent): C, 32.29; H, 6.58; P, 11.89; S, 36.95. Found (percent): C, 32.30; H, 6.54; P, 11.73; S, 37.5.

EXAMPLE 16

A mixture of 22.6 grams (0.01 mole) of S-propenyl diethyldithiophosphate and 9.6 grams (0.2 mole) methanethiol was reacted in a quartz pressure tube under autogenous pressure for 24 hours in a manner described in Example 14. NMR indicated 78% conversion. Vacuum distillation yielded 16.6 grams (77.5%) of S-2-methylmer- In the mice tests, adult male mice of the Swiss-Webster strain were given single calculated doses via a stomach syringe and observed for survival during a two week period. Doses ranging from 10 to 1000 mg. per body kg. were used. Each dose level was administered to at least two mice.

In the rats tests, each test compound was administered orally by stomach tube to five to eight groups of five male albino rats of the Sprague-Dawley strain, weighing 220 to 300 grams. Following intubation, the animals were closely observed for mortality and toxic effects periodically for a total time of 14 days.

In the cats test, young adult cats weighing between 2.6 and 3.8 kilograms were dosed via stomach tube with a calculated amount of the test material. Two to four cats were used at each dose level. Dosages ranged from 5 to 300 mg. per body kg. The animals were then observed for 48 hours for symptoms of toxicity.

The results of all the above tests are summarized in Table IV. The median lethal toxicities indicate the completely unexpected detoxifying effect of the β-methyl group of our new compounds.

TABLE IV.—ACUTE ORAL TOXICITIES OF STRUCTURALLY RELATED THIOPHOSPHATE INSECTICIDES

| Example number (designation) | Chemical structure | Median lethal dosage range, $LD_{50}$ mg./kg. Mice | Rats | Cats |
|---|---|---|---|---|
| 14 | $(C_2H_5O)_2PS_2CH_2CH(CH_3)SC_2H_5$ | 25–50 | ------------ | 25 |
| 15 | $(CH_3O)_2PS_2CH_2CH(CH_3)SC_2H_5$ | 200–300 | 316 | 250 |
| 16 | $(C_2H_5O)_2PS_2CH_2CH(CH_3)SCH_3$ | 25–50 | 7.9 | --------- |
| 18 | $(CH_3O)_2PS_2CH_2CH(CH_3)SCH_3$ | 50–100 | 147 | --------- |
| Thiometon | $(CH_3O)_2PS_2CH_2CH_2SC_2H_5$ | [a] 108 | 85 | [b] 5 |
| (Schrader) | $(C_2H_5O)_2PS_2CH_2CH_2SCH_3$ | ------------ | : 2.5 | --------- |
| Disyston | $(C_2H_5O)_2PS_2CH_2CH_2SC_2H_5$ | [a] 6 | [a] 2.5–12.6 | 5 |

[a] Reported by G. Schrader in "Die Entwicklung neuer insektizider Phosphorsaure-Ester," Verlag Chemie, Weinheim, Germany, 1963.

[b] The corresponding monothiophosphate was used.

EXAMPLE 22

Acute oral toxicities of the novel branched bis-dithiophosphates of Examples 4 and 8 were also studied in comparison with a known straight chain compound. For these studies, rats were used in the manner described in the previous example. The toxicity data obtained are shown by Table V. The results show that the bis-tertiary ester of Example 8 has an unexpectedly reduced toxicity reflected by the higher median lethal dosage which is between 100 and 200 mg. per body kg.

EXAMPLE 23

Toxicological tests of the compounds of Examples 15, 16 and 18 were also carried out using guinea pigs. In these tests, the test compounds were administered orally and subcutaneously to guinea pigs which were observed for toxic effects for at least 24 hours. A summary of the data are given by Table VI. These data indicate the same order of toxicity which was found on mice, rats and cats.

On the basis of their reduced toxicity towards mammalians, our novel compounds can be used for animal insect control where structurally related known compounds such as Disyston cannot be applied.

TABLE V

| Dosage level of test compound, mg./kg. | Detailed toxicity data on structurally related bis-dithiophosphates: $(C_2H_5O)_2P(=S)-S-C(CH_3)_2-S-P(=S)(OC_2H_5)_2$ Tertiary ester of Example 8 | $(C_2H_5O)_2P(=S)SCH_2CH(CH_3)SP(=S)(OC_2H_5)_2$ Secondary ester of Example 4 | $(C_2H_5O)_2P(=S)SCH_2CH_2SP(=S)(OC_2H_5)_2$ Primary ester (known) |
|---|---|---|---|
| | Number of dead rats out of two, on administration of test compounds | | |
| 10 | 0 | 0 | 0 |
| 25 | 0 | [1] 3 | [1] 4 |
| 50 | 0 | 2 | 2 |
| 100 | 0 | ------------------------------------ | 2 |
| 200 | [1] 4 | ------------------------------------ | 2 |

[1] The test was repeated with another two rats.

TABLE VI.—RESULTS OF ORAL AND SUBCUTANEOUS TOXICITY TESTS ON GUINEA PIGS

| Method of administration of test compound to guinea pigs | $(CH_3O)_2PS_2CH_2CH(CH_3)SCH_3$ Example 18 | $(CH_3O)_2PS_2CH_2CH(CH_3)SO_2H_5$ Example 15 | $(C_2H_5O)_2PS_2CH_2CH(CH_3)SCH_3$ Example 16 |
|---|---|---|---|
| | Minimum lethal dosage to guinea pigs, mg. test compound per kg. pig | | |
| Oral | >100 | >100 | 10 |
| Subcutaneous | 100 | 100 | 25 |

captopropyl diethyldithiophosphate as a yellow liquid boiling between 101–104° C. at a pressure of 0.05 mm.

*Analysis.*—Calcd. for $C_8H_{19}O_2PS_2$ (percent): C, 35.02; H, 6.97; P, 11.29; S, 35.02. Found (percent): C, 35.11; H, 7.04; P, 11.42; S, 34.85.

EXAMPLE 17 (E–958)

To 37.2 g. (0.2 mole) of distilled diethyl dithiophosphoric acid 17.6 g. (0.2 mole) of allyl methyl sulfide was added and the mixture was irradiated with stirring at 15° C. for 3 hours. A subsequent NMR analysis of a sample indicated no decrease of unsaturation. After the addition of 18.6 g. (0.1 mole) more acid, the mixture was irradiated for another 24 hours. This resulted in a complete disappearance of the unsaturation.

To remove the excess acid, the solution of the crude reaction mixture in 300 ml. ether was washed with two 100 ml. portions of 10% aqueous sodium hydrogen carbonate solution. The ether phase was then dried over anhydrous sodium sulfate and distilled. After stripping off the solvent, fractional distillation in vacuo yielded 38 g. (76%) of the adduct as a light yellow mobile liquid. Analysis of the adduct by NMR showed that it was S-2-(1-methylmercapto) propyl dithiophosphate, i.e. the α-methyl substituted ester arising via Markovnikov type addition.

*Analysis.*—Calcd. for $C_8H_{19}O_2PS_2$ (percent): C, 35.02; H, 6.97; P, 11.19; S, 35.02. Found (percent): C, 35.11; H, 7.04; 11.42; S, 34.85.

EXAMPLE 18

A mixture of 38.8 grams (0.2 mole) of S-propenyl dimethyldithiophosphate and 19.2 grams (0.4 mole) of methanethiol was reacted under the conditions of Example 14. After bleeding off the excess of methanethiol, a crude product containing 90% of S-2-methylmercaptopropyl dimethyldithiophosphate was obtained. This was washed as usual to remove the unreacted acid. Subsequent fractional distillation in vacuo yielded 34 grams (70%) purified S-2-methylmercaptopropyl dimethyldithiophosphate as a colorless liquid, boiling between 98–100° C. at 0.05 mm. pressure.

*Analysis.*—Calcd. for $C_6H_{15}O_2PS_2$ (percent): C, 29.25; H, 6.13; P, 12.57; S, 39.05. Found (percent): C, 29.58; H, 6.37; P, 12.73; S, 39.22.

trum of the resulting reaction mixture showed that 89% of the propenyl ethyl sulfide reacted.

To remove the starting acid, the crude mixture was dissolved in 300 ml. ether, washed twice, with 100 ml. portions of 5% aqueous sodium hydrogen carbonate solution. The ether phase was then dried and distilled in vacuo to remove the solvent and the unreacted propenyl sulfide (the last with a bath at 50° C. under 0.05 mm. pressure). In this manner, 35.2 grams (74%) of the adduct were obtained as a residual liquid product. NMR indicated that the structure of the adduct was that of a thioacetal resulting by ionic addition, i.e., S–1-ethylmercaptopropyl diethyldithiophosphate. NMR also indicated a minimum purity of 95% for this product.

*Analysis.*—Calcd. for $C_9H_{21}O_2PS_2$ (percent): C, 37.47; H, 7.33; P, 10.73, S, 33.36. Found (percent): C, 38.11; H, 7.52; P, 10.47; S, 33.57.

An attempt to further purify the above product by distillation at a pressure of 0.02 mm. resulted in a partial decomposition to yield diethyldithiophosphoric acid. The distilled product, obtained between 106–108° C., was an adduct of about 90% purity according to NMR.

EXAMPLE 20

The compounds of Examples 14–19 were tested as insecticides, miticides and nematocides in the manner described in Examples 9 and 10. In addition, the approximate range of the median lethal oral dosage of the various S–2-alkylmercaptopropyl dialkyldithiophosphates was determined on mice. In this latter test, adult male mice of the Swiss-Webster strain, 30–35 grams in weight, were given a single calculated dose via a stomach syringe and observed for survival during a two-week period. The data of all these tests are shown in Table III. They indicate that the S–2-alkylmercaptopropyl dialkyldithiophosphate type compounds of the present invention are highly desirable, relatively safe to use pesticides while the isomeric compounds (Examples 17 and 19) are practically worthless in this respect. Surprisingly, the methyl branching in the 2-position favorably affects the biological activity of the compounds of this invention. In contrast methyl or ethyl branching in the 1-position has an adverse effect on the pesticidal activity of compounds having similar structures.

TABLE III

| Example Number | Structure of compound | Percent mortality produced (by percent spray): House flies 24 hrs. (0.01) | Mexican bean beetles: Contact, 48 hrs. (0.01) | Mexican bean beetles: Systemic, 5 days (0.01) | Pea aphids: Contact, 48 hrs. (0.001) | Pea aphids: Systemic, 5 days (0.001) | Mites: Contact, 48 hrs. (0.001) | Mites: Systemic, 5 days (0.001) | Percent routine control of nematodes at 40 lbs. per acre | Median lethal dose (oral on mice) LS50 mg./kg. |
|---|---|---|---|---|---|---|---|---|---|---|
| 18 | $(CH_3O)_2P(=S)SCH_2CH(CH_3)SCH_3$ | 0 | 0 | 0 | [illegible] | 100 | 2 | 100 | 100 | 50–100 |
| 15 | $(CH_3O)_2P(=S)SCH_2CH(CH_3)SC_2H_5$ | 0 | 0 | 100 | [illegible] | 0 | 0 | 100 | 40 | 200–300 |
| 16 | $(C_2H_5O)_2P(=S)SCH_2CH(CH_2)SCH_3$ | [illegible] | | 100 | 0 | 0 | [illegible] | 8 | 100 | 25–50 |
| 17 | $(C_2H_5O)_2P(=S)SCH(CH_3)CH_2SCH_3$ | [illegible] | [illegible] | [illegible] | | | | [illegible] | ----------- | 25–50 |
| 14 | $(C_2H_5O)_2P(=S)SCH_2CH(CH_3)SC_2H_5$ | [illegible] | 0 | 0 | 0 | [illegible] | | 21 | 30 | 25–50 |
| 19 | $(C_2H_5O)_2P(=S)SCH(C_2H_5)SC_2H_5$ | [illegible] | [illegible] | [illegible] | | | [illegible] | [illegible] | ----------- | ----------- |

EXAMPLE 19

20.4 grams (0.02 mole) of propenyl ethyl sulfide were added slowly with stirring and water cooling between 20–40° C. to 27.2 grams (0.2 mole) of diethyldithiophosphoric acid. An exothermic reaction took place. The intensity of the olefinic hydrogen signals in an NMR spec-

EXAMPLE 21

The acute oral toxicities of the compounds of the present invention were investigated in comparison with structurally related known thiophosphate insecticides. Approximate median lethal toxicities were determined on mice, rats and cats.

EXAMPLE 24

The relatively nontoxic compounds of Examples 18 and 15 were tested as animal insecticides on guinea pigs infested with engorging nymphs of the lone star tick [*Amblyomma americanum* (L.)] and larvae of the secondary screw-worm [*Cochliomyia macellaria* (Fabricus)] and of the black-blowfly [*Phormia regina* (Meigen)]. Stable flies [*Stomoxys calcitrans* (L.)] are fed on the guinea pigs at 4 hours after treatment. Engorged flies are held for 24 hours to see if they are killed by the blood they ingested.

The test compounds formulated as 5% solutions in Tween 20, were orally administered at an initial dosage of 100 mg. per kg. If any of the arthropods were killed, the dosage was lowered to the minimum systemically effective dosage. The results are shown by Table VII. The data indicate that both of the compounds are effective in controlling all the insect species at a dosage of 100 mg. per kg.

EXAMPLE 25

The compounds of Examples 16 and 18 were also tested on cattle as animal insecticides. The tests of this example were designed to determine if these insecticides are systemically effective against common cattle grubs, [*Hypoderma lineatum* (de-Villers)]. Cattle were treated in Texas, when cattle grubs were located in the internal tissues of cattle, after the end of the heel fly season and before grubs appear in the animals' backs, i.e. in June. Cattle grubs began to appear in these animals' backs in September. Peak numbers were found in December. To determine the effectiveness of the treatments, animals were examined monthly and as cattle grubs appeared in these animals' backs, they were recorded to obtain cumulative counts of the total number of grubs encysting in the back of each animal. The results of the oral administration of the test compounds are shown by Table VIII. The data indicate that the compounds, especially the compound of Example 18 provides a high degree of systemic control.

EXAMPLE 26

The compounds of Examples 14 to 16 and 18 were also tested as cattle insecticides for the prevention of reproduction in Boophilus ticks. Colonies of the cattle tick [*Boophilus annulatus* (Say)] and the Southern cattle tick [*Boophilus annulatus microplus* (Canestrini)] were maintained.

Larvae from the colonies were placed onto cattle and in 3–4 weeks engorged female ticks drop off the cattle onto the floors of stalls and are collected for use in the screening test.

In the laboratory, these ticks were washed, dried, and sorted into groups of 10. Each group is weighed and only those weighing more than 2 g. are used.

The test compounds were formulated as emulsifiable concentrates containing 25% active ingredient, 65% xylene, and 10% Triton X-100 emulsifier. They were then routinely tested at concentrations of 1%, 0.1% and 0.01%. The 1% concentrations are prepared immediately before ticks are dipped and lesser concentrations are obtained by serial dilution of the 1% concentration.

Ticks were dropped into 50 ml. of the insecticide. The liquid with the ticks is stirred vigorously for 30 seconds and then poured through a screen that retains the ticks. After a short time on the screen the ticks were transferred to paper toweling and allowed to dry. Ticks were then placed in 8 dram shell vials with paper covers and held in a constant temperature cabinet at 80°±1° F. and 70–80% relative humidity.

After 2 weeks the ticks were examined, and eggs were weighed. The ticks were discarded at this time but the eggs were held for another month. At the end of this period the percent hatch was estimated.

For use as controls, a number of ticks are dipped in an emulsion of 2.6% xylene and 0.4% Triton X-100.

Test solution was considered effective for prevention of reproduction in Boophilus ticks if weight of eggs laid by treated ticks is less than 10% of weight of eggs laid by control ticks and/or 10% less of the eggs hatch.

The minimum effective concentrations of the test compounds are given in Table IX. The data show that at 1% concentration all our compounds were effective. The more effective compounds, i.e. those of Examples 14 and 16, provided control of reproduction at 0.1% concentration.

TABLE VII.—RESULTS OF TESTS ON GUINEA PIGS FOR ANIMAL SYSTEMIC INSECTICIDAL ACTIVITY

| Example Number | Chemical structure | Lowest oral dosage causing 100% kill of— Engorging ticks | Stable flies | Larvae of— Secondary screw-worm | Black-blow fly |
|---|---|---|---|---|---|
| 18 | $(CH_3O)_2P(=S)SCH_2CH(CH_3)SCH_3$ | 25 | 100 | 50 | 100 |
| 15 | $(CH_3O)_2P(=S)SCH_2CH(CH_3)SC_2H_5$ | 25 | 100 | 25 | 25 |

TABLE VIII.—RESULTS OF TESTS ON CATTLE FOR SYSTEMIC CONTROL OF CATTLE GRUBS

| Example Number | Chemical structure | Number of cattle— In test | Infested | Average number of grubs | Percent control | Dosage of treatment (mg./kg.) |
|---|---|---|---|---|---|---|
| 18 | $(CH_3O)_2P(=S)SCH_2CH(CH_3)SCH_3$ | 3 | 2 | 4.7 | 74 | 5 |
| 16 | $(C_2H_5O)_2P(=S)SCH_2CH(CH_3)SCH_3$ | 3 | 1 | 1.0 | 94 | 10 |
| | ---------- | 11 | 11 | 18.3 | 0 | None |

TABLE IX.—RESULTS OF TESTS FOR THE PREVENTION OF REPRODUCTION OF CATTLE TICKS

| Example Number | Chemical structure | Lowest effective concentration of test compound, percent: The cattle tick | Lowest effective concentration of test compound, percent: Southern cattle tick |
|---|---|---|---|
| 18 | $(CH_3O)_2PS_2CH_2CH(CH_3)SCH_3$ | [illegible] | [illegible] |
| 15 | $(CH_3O)_2PS_2CH_2CH(CH_3)SC_2H_5$ | [illegible] | [illegible] |
| 16 | $(C_2H_5O)_2PS_2CH_2CH(CH_3)SCH_3$ | 0.1 | 0.1 |
| 14 | $(C_2H_5O)_2PS_2CH_2CH(CH_3)SC_2H_5$ | 0.1 | 0.1 |

What is claimed is:

1. A compound having the formula

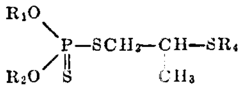

wherein $R_1$ and $R_2$ are $C_1$ to $C_3$ alkyl radicals and $R_4$ is $C_1$ to $C_3$ alkyl, phenyl, $C_7$ to $C_{10}$ alkylphenyl, $C_7$ to $C_{10}$ phenylalkyl, chlorophenyl, bromophenyl, nitrophenyl.

2. A compound according to claim 1 wherein $R_1$, $R_2$ and $R_4$ are methyl, ethyl or propyl.

3. A compound of the formula

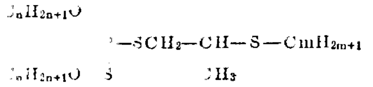

wherein $m$ and $n$ are 1 or 2.

4. A compound according to claim 3 where $m$ is 2 and $n$ is 1.

5. A compound according to claim 3 where $m$ is 1 and $n$ is 1 or 2.

References Cited

UNITED STATES PATENTS 2,952,700 9/1960 Lorenz et al. ........ 260—948

LEWIS GOTTS, Primary Examiner

A. H. SUTTO, Assistant Examiner

U.S. Cl. X.R.

204—162 R; 252—46.6; 260—932, 949, 957, 968, 978